(12) United States Patent
Worth

(10) Patent No.: US 6,405,671 B1
(45) Date of Patent: Jun. 18, 2002

(54) METHOD OF INDICATING A HELIX PITCH OF A REPAIR SUBSTRATE WRAPPED ABOUT A CYLINDRICAL STRUCTURE

(75) Inventor: Franz L. Worth, Angwin, CA (US)

(73) Assignee: Air Logistics Corporation, Pasadena, CA (US)

( * ) Notice: Subject to any disclaimer, the term of this patent is extended or adjusted under 35 U.S.C. 154(b) by 0 days.

(21) Appl. No.: 09/566,248

(22) Filed: May 5, 2000

Related U.S. Application Data
(60) Provisional application No. 60/132,612, filed on May 5, 1999.

(51) Int. Cl.[7] ............................................. F16L 55/168
(52) U.S. Cl. ................ 116/200; 116/201; 116/DIG. 14; 138/99; 428/343
(58) Field of Search ................................. 116/200, 201, 116/278, DIG. 14, 206; 33/755, 758, 759; 428/343; 138/104, 99, 172

(56) References Cited

U.S. PATENT DOCUMENTS

| | | | |
|---|---|---|---|
| 2,187,087 A | 1/1940 | Leary | 33/758 |
| 2,679,968 A | 6/1954 | Richter | |
| 3,367,370 A | 2/1968 | Sherlock | 138/104 |
| 3,502,436 A * | 3/1970 | Hoover et al. | 422/56 |
| 4,121,686 A * | 10/1978 | Keller, Jr. et al. | 181/233 |
| 4,322,262 A * | 3/1982 | Cottam | 156/392 |
| 4,351,113 A | 9/1982 | Eggertsen et al. | 33/758 |
| 4,367,590 A * | 1/1983 | Winter et al. | 33/758 |
| 4,417,603 A * | 11/1983 | Argy et al. | 138/149 |
| 4,590,108 A * | 5/1986 | Nippe | 138/149 |
| 4,645,697 A * | 2/1987 | Torigoe | 428/43 |
| 4,699,838 A | 10/1987 | Gilbert | 428/201 |
| 5,107,601 A * | 4/1992 | Semchuck | 33/759 |
| 5,134,000 A | 7/1992 | Smythe et al. | 428/34.9 |
| 5,175,032 A | 12/1992 | Steele et al. | 428/34.9 |
| 5,228,478 A | 7/1993 | Kleisle | 138/104 |
| 5,364,677 A * | 11/1994 | Sendziak | 428/40.1 |
| 5,411,777 A | 5/1995 | Steele et al. | 428/34.9 |
| 5,520,218 A | 5/1996 | Hlavinka et al. | 138/89 |
| 5,647,401 A | 7/1997 | Nobori | 138/126 |
| 5,666,737 A | 9/1997 | Ryan, III | 33/562 |
| 5,690,146 A | 11/1997 | Stammen | 138/36 |
| 5,699,828 A | 12/1997 | Helmsderfer | 137/375 |
| 5,814,387 A * | 9/1998 | Orihara et al. | 428/63 |
| 5,817,413 A | 10/1998 | Huddleston et al. | 428/356 |
| 5,869,153 A | 2/1999 | Sutherland et al. | 428/34.9 |
| 5,894,864 A * | 4/1999 | Rich | 138/99 |
| 5,950,321 A | 9/1999 | Peña et al. | 33/758 |
| 5,953,826 A | 9/1999 | Goodyer et al. | 33/758 |
| 5,983,949 A | 11/1999 | Pohle | 138/104 |

\* cited by examiner

*Primary Examiner*—Diego Gutierrez
*Assistant Examiner*—R. Alexander Smith
(74) *Attorney, Agent, or Firm*—Christie, Parker & Hale, LLP

(57) ABSTRACT

In the process of wrapping a strip-like flexible repair substrate around a cylindrical article such as a pipe, an edge of the repair substrate is aligned with at least one visible indicia along the length of the previously wrapped repair substrate to easily control the amount of overlap, or pitch of the helix, between adjacent substrate layers created by successive wraps of the substrate about the article. Each of these indicia allow the substrate to overlap the previously wrapped substrate by a consistent amount, the amount desired being dependent upon the application and amount of strength required for the repair.

29 Claims, 1 Drawing Sheet

METHOD OF INDICATING A HELIX PITCH OF A REPAIR SUBSTRATE WRAPPED ABOUT A CYLINDRICAL STRUCTURE

CROSS-REFERENCE TO RELATED APPLICATION

This application claims the benefit of U.S. Provisional Application No. 60/132,612, filed May 5, 1999.

FIELD OF THE INVENTION

This invention relates to a process of wrapping a strip-like flexible repair substrate around a cylindrical structure. An edge of the repair substrate aligns with a visible indicia along the length of the previously wrapped repair substrate to control the amount of overlap, or helix pitch, between adjacently wrapped substrate layers. The indicia allows a consistent overlap, the amount of overlap desired being dependent upon the application and amount of strength required for the repair.

BACKGROUND OF THE INVENTION

Pipe systems provide basic utilities to the public, such as water, gas, petroleum, and sewage. These basic utilities and petroleum pipeline operators are often heavily relied upon by the public. As such, the pipe systems are usually in a state of full operation, i.e. optimal flow rate. There is usually a very limited amount of time that the pipes and pipe systems operate at a reduced flow rate, while not seriously affecting utility service.

Pipelines and other cylindrical structures, whether above ground or below, occasionally suffer damage. Over time, these cylindrical structures can be damaged from rust, corrosion or other degradation. Further, the damage can occur during repair or installation, for example from tool impact or falling debris.

At a damaged area of the pipe, there is a smaller cross-sectional thickness of the pipe. The thickness of the pipe is inversely proportional to the hoop stress of the pipe, i.e. the circumferential stress in the pipe due to the operational fluid pressures in the pipe. Accordingly, there is a larger hoop stress in the damaged area as compared to the rest of the pipe.

The hoop stress in the pipe is proportional to the strain in the pipe. Therefore, the larger hoop stress in the damaged area results in a proportionally larger strain. The larger strain in the damaged area of the pipe causes further damage. Consequently, the flow through the pipe, and resulting pressure therefrom, is usually reduced or stopped to prevent further breakage or leaking from the structure until the pipe is repaired or replaced. This flow reduction is undesirable because the utility service is correspondingly reduced.

It is usually more cost effective to permanently repair the leaking pipe rather than replace it. When the damaged pipe is replaced, the downtime of the system, the labor costs, the material costs, as well as the costs associated with the loss of utility services are usually large.

An expedient method of repair involves, at least in part, applying a structural reinforcement by way of wrapping the structure with a flexible repair substrate. Such flexible substrates are commonly tapes (defined principally by films) woven fabrics, and non-woven fabrics. Non-woven fabrics are characterized by the non-parallel, random organization of the component fibers, for example, paper. The flexible substrates are often used in conjunction with various adhesives, resins, putties, and fill materials.

The flexible repair substrate has a characteristic tensile strength of its own. The substrate preferably is tensioned or pulled when surrounding the pipe undergoing fluid pressures. In the finished repair, the several turns of the substrate about the pipe are in tension, thus applying to the pipe a compressive force pattern which acts in the pipe counter to hoop stresses created by pressure of the fluid in the pipe. When the pipe is strained by internal fluid pressure, the repair substrate in the repair also strains proportionally to share hoop stress with the pipe. This method of repair keeps the strain and stress in the damaged area of the pipe within acceptable limits, when full operational fluid pressures are applied within the pipe. If one layer of substrate cannot withstand the tension created by the shared hoop stress, additional layers of substrate are overlapped for added strength. As more layers of substrate are wrapped, there is a corresponding larger amount of hoop stress absorbed by the substrate and taken away from the pipe.

Further, the amount of substrate overlapping on the previously wrapped substrate corresponds directly to the amount of strength added to the pipe by the repair. For a smaller operational pipe pressure, a smaller amount of overlap is preferred. If there is too much overlap for the design pressures, the repair is too costly. For a higher design hoop stress, a larger substrate overlap is preferred. If there is not enough overlap, the substrate repair does not have enough strength to withstand the design pressures and the pipe will strain and become further damaged.

The layered structure results in a partial overlap between adjacent layers. The partial overlap of the adjacent layers renders the substrate being angled relative to the central axis of the. structure, or having a spiral-shape or helix-shape wrapping material about the structure. With a low helix pitch, there is a greater the amount of overlapping substrate. Conversely, with a greater helix pitch, there is a lesser amount of substrate that overlaps.

The most common structures that are repaired by way of wrapping with a flexible substrate are cylindrical structures, such as utility poles, architectural and industrial support columns, and pipes. However, other shaped structures, with both regular and irregular cross-section can also often be advantageously repaired by way of wrapping the structure with a flexible reinforcing substrate.

SUMMARY OF THE INVENTION

In order for the amount of overlapping of a flexible repair substrate to be at a consistent, economical, and structurally adequate level, the helix pitch of the substrate is controlled during application. The method of controlling the helix pitch involves aligning an edge of an overlapping flexible reinforcing substrate with visible indicia along the length of the previously wrapped substrate. Providing a guide to allow easy, accurate application of a reinforcing wrap is particularly helpful to minimize errors when the wrap is not easily removable once applied, because of strong adherence of successive wraps of the substrate to each other, for example.

When using the flexible reinforcing substrate with indicia along the substrate for controlling helix pitch or overlap as provided herein, the user begins by affixing, either permanently or removably, a transverse edge of the substrate to the damaged article. Then, the user wraps the substrate around the damaged article. As the substrate begins to overlap, the user aligns the edge of the substrate of the overlapping layer with the desired indicium provided for the desired helix pitch. Thereafter, the user merely maintains the alignment of the edge of the substrate with that indicium as the substrate is wrapped around the damaged article. When the desired coverage of the damaged article has been achieved, the user simply cuts off any excess substrate and affixes the trailing end of the substrate to the damaged article, either permanently or removably, as desired in a particular application.

When there is a constant amount of overlapping substrate, there is a constant amount of tensile strength provided by the substrate along the length of the completed repair. The amount of tensile strength (or overlapping substrate) that is needed to adequately repair the pipe is determined by the operational design pipe pressure. Each indicator on the substrate corresponds to a different level of tensile strength. As long as the design pipe pressure is known, the user knows which of several visible indicia to follow.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION

Figure 1:
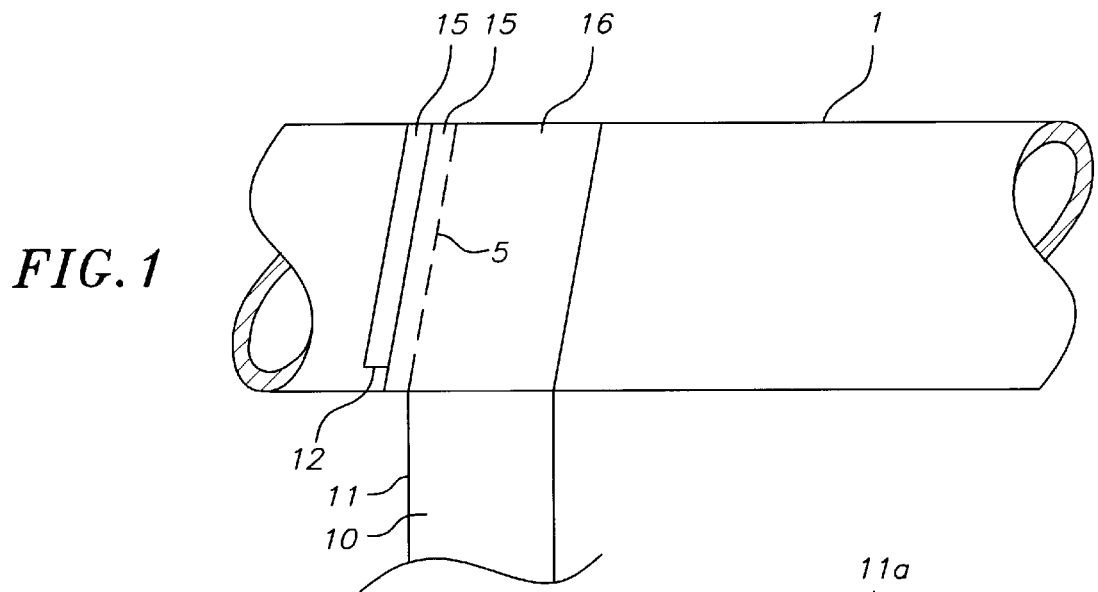
FIG. 1 schematically illustrates a side view of a cylindrical structure wrapped with a substrate having visible indicia.

FIG. 1 illustrates a side view of a cylindrical structure 1 wrapped with a flexible reinforcing strip substrate 10 having a visible indicator 5. The visible indicator 5 is parallel to and spaced at a constant distance from a longitudinal edge 11 of the substrate throughout the length of the substrate.

The visible indicator 5 is shown schematically as a discontinuous or dashed line in FIG. 1, but is not limited as such. For instance the visible indicator 5 may also be a solid continuous line along the length of substrate. In an alternative embodiment, a continuous fiber in a woven substrate is a discontinuous indicator because the fiber is woven into a fabric, such that the fiber is partially obscured by fibers running perpendicular to the trace fiber.

In this embodiment, the strip of substrate 10 is wrapped in a helical shape about the cylindrical structure 1 over a previously wrapped portion of the same substrate. The substrate has a transverse edge 12 and a longitudinal edge 11. The transverse edge 12 is placed on the pipe as wrapping of the substrate is begun. The longitudinal edge of the overlapping substrate 10 is aligned with the visible indicia 5 of the previously wrapped substrate so that the amount that the new turn of substrate 10 overlaps the previously wrapped substrate remains substantially constant throughout the length of repair along structure 1.

The substrate 10 has an upper section 15 and a lower section 16 separated by the visible indicator 5. The lower section 16 has a constant width throughout the length of the substrate. Only the lower section 16 is overlapped by an additional wrapped layer of substrate 10. As a result, the amount of overlapping is easily maintained throughout the repair. Further, the upper section 15 along the entire length of the substrate remains exposed, as shown in FIG. 1.

Figure 2:
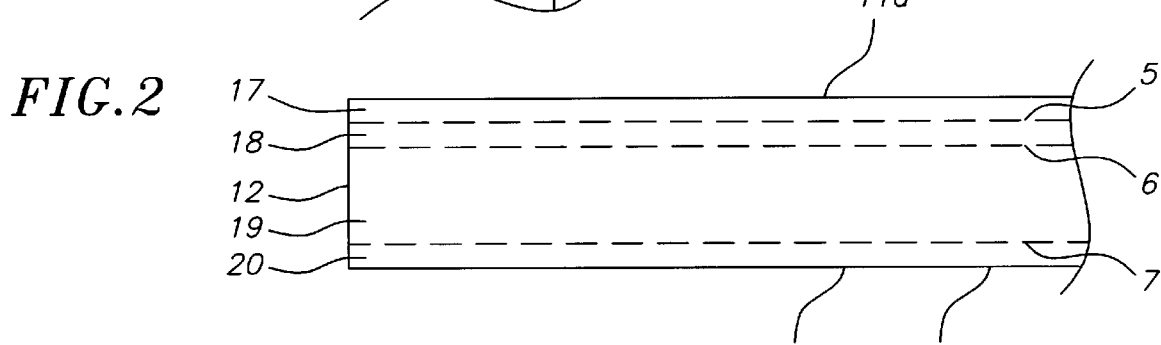
FIG. 2 schematically illustrates a substrate having multiple visible indicia along its length.

In an embodiment shown in FIG. 2, there are a several visible indicia 5, 6, 7 provided along the entire length of the flexible reinforcing substrate at different distances from the longitudinal edge 11a of the substrate. Providing indicia at different distances from the edge 11a will allow the same substrate to be provided for use in repairs requiring different levels of overlap (i.e. different strengths are required of the substrate due to the different applications or pipe pressures). The indicia 5, 6, 7 are spaced from the edge 11a to provide for two or more helix pitches or levels of overlap as desired. In one usage, the longitudinal edge 11a aligns on top of the visible indicator 5, 6, 7. In another usage, the longitudinal edge 11a aligns with a bottom edge of the visible indicator 5, 6, 7. In yet another usage, the longitudinal edge 11a is positioned in between visible indicators 5 and 6.

In between the longitudinal edge 11a and visible indicator 5 is a first upper section 17. Section 17 remains exposed throughout the length of the repair when visible indicator 5 is used as the wrap pitch guide. In between the longitudinal edge 11a and visible indicator 6 is a second upper section 18. Upper sections 17 and 18 remains exposed throughout the length of the repair when visible indicator 6 is used as the wrap pitch guide. In between the longitudinal edge 11a and visible indicator 7 is a third upper section 19, and in between the longitudinal edge 11b and visible indicator 7 is section 20. When visible indicator 7 is used as the wrap guide, either upper section 19 or upper section 20 remains exposed throughout the length of the repair, depending upon which of the longitudinal edges of the substrate is to be the exposed outer edge of the substrate as wrapped.

To further increase the versatility of the product, indicia 5, 7 are spaced relative to each longitudinal edge 11a, 11b of the substrate, so that indicia 5, 7 are provided for both right and left-handed applications of the substrate. Indicia provided along each longitudinal edge also allows a first substrate to be wrapped in a clockwise direction about the cylindrical structure, while following the indicator 5. Simultaneously, a second substrate that follows indicator 7 can be wrapped counterclockwise on top of the first substrate when there are design pressures that call for at least two substrates overlapping and wrapping the pipe.

In a first embodiment, the visible indicia are designated by a color that contrasts with the substrate. The contrasting color can use ink, paint, or another applied pigment. In a flexible reinforcing substrate that is a woven material, contrasting fibers or filaments can be provided in the warp (wrapping) direction. For non-woven substrates, the indicia can use imbedded or attached trace fibers, or imprinted marks. In the embodiment shown in FIG. 2, each visible indicator 5, 6, 7 preferably has a different color trace fiber associated therewith throughout the length of the substrate in order to indicate different helix pitches. The color contrast to enable the user to readily discern the indicia from the substrate is from variations in the gray-scale, such as black and white. Alternatively, the contrasting colors can be from variations in the primary colors such as red, blue, yellow, or combinations thereof. The contrasting colors can be provided in solid lines along the length of the substrate. Alternatively, the contrasting colors can be provided in dashed lines or periodically throughout the length of the substrate.

In a second embodiment, the visible indicators 5, 6, 7 can be groups of trace fibers with different discernible thicknesses. The thicknesses are established by the size of each trace fiber, or alternatively, a number of trace fibers are grouped together to give the appearance of a thicker width. The thicker fibers are provided in a solid line along the length of the substrate. Alternatively, the thicker fibers are provided in a dashed line or periodically throughout the length of the substrate.

Alternatively or additionally to the embodiments of the indicators discussed above, the indicators 5, 6, 7 can have different textures that are followed by feeling the indicators. The textured fibers extend above the surface of the substrate. These indicators are desired for use in instances where there is limited lighting. The textured fibers are provided in a solid line along the length of the substrate. Alternatively, the textured fibers are provided in a dashed line or periodically throughout the length of the substrate.

Figure 3:
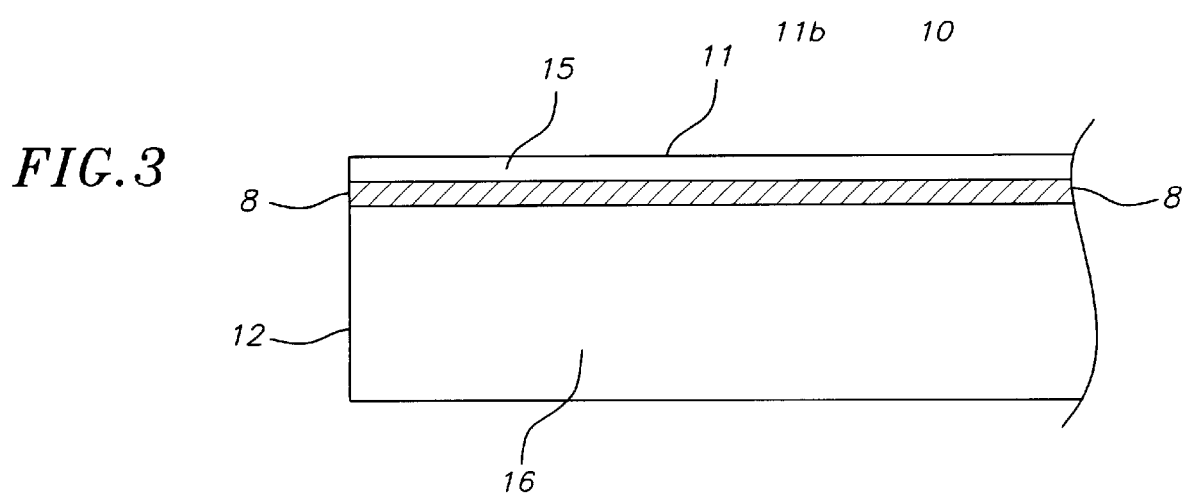
FIG. 3 schematically illustrates an alternative embodiment of a substrate having a band along its length as a visible indicator.

In the embodiment shown in FIG. 3, a visible indicator 8 is a thick band along the length of the substrate. The thick band is a width of material that contrasts with the substrate. In a first embodiment, the contrast is a color of the band that contrasts with the substrate. In a second embodiment, the contrast is texture of the band. In a third embodiment, the contrast is a combination of color and texture. The band width provides the indicia of the desired overlap.

Substrates used to wrap cylindrical structures are preferably fiberglass and other composite fabrics impregnated or coated with resins that cure to a hard, structurally strong state within a short period of time. One example of this is a fiberglass substrate, pre-impregnated with a polyisocyanate resin which cures into a hard polyurea upon contact with water or atmospheric moisture.

A fiberglass substrate is formed by weaving fibers or filaments of desired characteristics. Fibers or filaments of different materials can be incorporated into the substrate. Commonly used fibers and filaments include glass, carbon, steel, kevlar, and plastic.

By substituting contrasting fibers at operative positions in the warp (wrapping) direction of the substrate, an indicia is provided to allow the user to easily apply the substrate in the desired helix pitch or amount of overlap.

In the case of non-woven fabrics as the substrate material, colored or contrasting fibers or imprinting processes are used to provide the indicia. For those types of substrates, the fibers are either imbedded within the substrate, or affixed to the surface of the substrate by any suitable means.

While various embodiments of this invention have been shown and described, it would be apparent to those skilled in the art that many more modifications are possible without departing from the inventive concept herein. For example, the visible indicia can be provided on any size substrate that wraps about cylindrical structures, and is not limited to smaller substrates such as those having widths of 4 inches to 7 inches. Further, the applications for the methods of the present invention are not limited to utility pipelines. For example, the methods of the present invention can similarly be used to wrap columns, such as those columns used to structurally support bridges. The columns may be in need of repair or may need retrofitting. In either case, the wrapping of the substrate about the column provides for additional structural support of the column. It is, therefore, to be understood that within the scope of the appended claims, this invention may be practiced otherwise than as specifically described.

What is claimed is:

1. A method to setting a helix pitch of a flexible substrate to be wrapped about a cylindrical structure comprising:
   providing a flexible substrate with upper and lower faces with two longitudinal edge and a visible indicator on the substrate that is parallel to and spaced apart from the longitudinal edges of the substrate, the visible indicator being visible at least on the upper face;
   wrapping the substrate around a cylindrical stricture with the upper face facing outwardly; and
   using the visible indicator to set and maintain a consistent helix pitch of the flexible substrate wrapped around the cylindrical structure by laying one said longitudinal edge of each turn of the substrate a consistent distance away from the visible indicator of an underlaying turn of the substrate.

2. The method of claim 1 wherein the visible indicator is used by lining up the one said longitudinal edge adjacent to the visible indicator.

3. The method to claim 1 wherein the visible indicator is a thick band with two indicator edges and the visible indicator is used by lining up the one said longitudinal edge in between the edges of the visible indicator.

4. The method of claim 1 wherein there are additional visible indicators spaced at different distances from and parallel to the one said longitudinal edge of the substrate, such that the substrate is usable for different applications where different helix pitches are desired.

5. The method of claim 4 wherein the one said latitudinal edge is lined up between two said visible indicators that are adjacent to each other.

6. The method according to claim 4 further comprising wrapping a second substrate having visible indicia over the substrate wrapped about the cylindrical structure in a direction opposite the substrate wrapped about the cylindrical structure.

7. The method according to claim 4 wherein each of the visible indicators have a feature that is distinguishable from the other visible indicators, wherein the feature is having at least one of a different width, color and texture.

8. The method according to claim 1 wherein the flexible substrate is a length of woven fiberglass fabric, wherein the visible indicia is provided by at least one strand of material woven in the warp direction of the substrate, and wherein the indicia has an appearance that contrasts with adjacent fabric of the woven fiberglass fabric.

9. The method according to claim 1 wherein the substrate is a reinforcing substrate impregnated with a hard-curing resin.

10. The method according to claim 1 wherein the visible indicator is at least one of a contrasting texture and a contrasting color with the substrate.

11. The method according to claim 10 wherein the contrasting texture are fibers that are one of imbedded within the substrate and affixed to the surface of the substrate.

12. The method according to claim 1 wherein the visible indicator has a substantially thicker trace fiber than an adjacent fiber of the substrate.

13. The method according to claim 1 wherein the visible indicator is a group of trace fibers distinguishable from an adjacent fiber of the substrate.

14. The method according to claim 1 wherein the visible indicator is a band that contrasts with sections of substrate that are adjacent the band.

15. The method according to claim 1 wherein the visible indicator is a continuous trace line.

16. The method according to claim 1 wherein the visible indicator is a discontinuous trace line.

17. The method according to claim 1 wherein the substrate comprises a woven structure pre-impregnated with a hard-curing resin.

18. A method of applying a constant tensile strength from a substrate throughout a length of repair along a cylindrical structure comprising:
   providing a flexible substrate with upper and lower faces and two longitudinal edges and a visible indicator on the substrate that is parallel to and spaced apart from the longitudinal edges of the substrate, said visible indicator indicating a constant tensile strength;

wrapping the substrate around a cylindrical structure with the upper side facing outwardly; and using the visible indicator to set and maintain a consistent amount of overlap of the flexible substrate wrapped around the cylindrical structure by laying one said longitudinal edge of each turn of the substrate a consistent distance from the visible indicator of an underlaying turn of the substrate along the length of the substrate.

19. The method of claim 18 wherein there are additional visible indicators spaced at different distances from and parallel to one said longitudinal edge of the substrate, such that the substrate is usable for different applications where a different amount of overlap and tensile strength is desired.

20. A repaired cylindrical structure comprising:

a cylindrical structure having a circumference and a repair site; and a flexible strip-like tensionable and substantially inelastic substrate consistently helically wrapped around the repair site to provide strengthening to the repair site, the substrate having a first and a second longitudinal edge, a visible indicator that is parallel to and spaced from the first and the second longitudinal edges, an area between the first longitudinal edge and the visible indicator defining an upper substrate section and an area between the second longitudinal edge and the visible indicator defining a lower substrate section, wherein the repair site of the cylindrical structure is helically wrapped with the substrate such that after a first loop of the substrate is helically wrapped around the repair site, subsequent loops of the substrate are helically wrapped around the lower substrate section of the immediately proceeding loop of substrate using the visible indicator line of the immediately proceeding loop of substrate as a guide line with which to align the first longitudinal edge to thereby ensure a consistent helical wrapping of the substrate on the repair site.

21. The repaired cylindrical structure of claim 20 wherein the visible indicator is at least one of a contrasting texture and a Contrasting color when compared to the substrate.

22. The repaired cylindrical structure of claim 20 wherein there are additional visible indicators that are parallel to the first and second longitudinal edges of the substrate, such that depending upon which visible indicator is used to align the first longitudinal edge of subsequent loops of substrate, the degree of overlap of the substrate is different and provides for different amounts of repair site strength.

23. A flexible repair substrate for helically wrapping around at least a portion of a structure to provide consistent helical wrapping of the substrate around the structure, the flexible substrate comprising:

a section of a fabric having a length and a width defined by two longitudinal edges and an upper and lower face, the fabric having a visual indicator mark that is visible at least on the upper face and is parallel to and spaced away from the two longitudinal edges and formed along at least portions of the length of the fabric, the spacing of the visual indicator mark from the longitudinal edges determining the degree of overlap and said consistent helical wrapping that consecutive layers of the flexible repair substrate make when being helically wrapped around a structure.

24. The flexible repair substrate of claim 23, wherein there are additional indicators spaced at different distances from and parallel to the longitudinal edges of the substrate, such that the substrate is usable for different applications where a different degree of overlap and said consistent helical wrapping is desired.

25. The composite flexible repair substrate of claim 23 where the substrate is pre-impregnated with a hard-curing resin.

26. A flexible repair substrate for helically wrapping around at least a portion of a structure to provide a constant tensile strength throughout a length of repair along a structure, the flexible substrate comprising upper and lower faces and two longitudinal edges and a visible indicator on the substrate that is parallel to and spaced apart from the longitudinal edges of the substrate, and formed along at least portions of the substrate, the spacing of the visual indicator mark from the longitudinal edges determining the degree of overlap and said constant tensile strength that consecutive layers of the flexible repair substrate make when being helically wrapped around a structure.

27. The flexible repair substrate of claim 26, wherein there are additional indicators spaced at different distances from and parallel to the longitudinal edges of the flexible substrate, such that the flexible substrate is usable for different applications where a different degree of overlap and said constant tensile strength is desired.

28. The composite flexible repair substrate of claim 26 where the flexible substrate is pre-impregnated with a hard-curing resin.

29. A method of setting a helix pitch of a flexible substrate to be wrapped about a cylindrical structure comprising:

providing a flexible substrate with two longitudinal edges and a plurality of visible indicators on the substrate that are parallel to and spaced apart at different distances from the longitudinal edges of the substrate, said visual indicators defining different helix pitches;

wrapping the substrate around the cylindrical structure; and using The visible indicators to set and maintain a consistent helix pitch of the flexible substrate wrapped around the cylindrical structure by laying one said longitudinal edge of each turn of the substrate a consistent distance away from a selected one of said visible indicators located on an underlaying turn of the substrate, such that the substrate is usable for different applications where a different amount of substrate strength is desired.

* * * * *

UNITED STATES PATENT AND TRADEMARK OFFICE
CERTIFICATE OF CORRECTION

PATENT NO.   : 6,405,671 B1
DATED        : June 18, 2002
INVENTOR(S)  : Franz L. Worth It is certified that error appears in the above-identified patent and that said Letters Patent is hereby corrected as shown below:

Column 5,
Line 62, replace "edge" with -- edges --.
Line 66, replace "stricture" with -- structure --.

Column 6,
Line 10, replace "method to" with -- method of --.
Line 19, replace "latitudinal" with -- longitudinal --.

Column 7,
Lines 36 and 37, replace "proceeding" with -- preceding -- (both occurrences).
Line 43, replace "a Contrasting" with -- a contrasting --.

Column 8,
Line 48, replace "using The" with -- using the --.

Signed and Sealed this

Twenty-fifth Day of February, 2003

JAMES E. ROGAN
*Director of the United States Patent and Trademark Office*